United States Patent
Shih

(10) Patent No.: US 7,830,454 B2
(45) Date of Patent: Nov. 9, 2010

(54) TV SIGNAL PROCESSOR WITH MINI-PCI INTERFACE

(75) Inventor: Yu-Chiang Shih, Hsintien City (TW)

(73) Assignee: Animation Technologies Inc., Hsintien, Taipei Hsien (TW)

( * ) Notice: Subject to any disclaimer, the term of this patent is extended or adjusted under 35 U.S.C. 154(b) by 1005 days.

(21) Appl. No.: 11/635,666

(22) Filed: Dec. 8, 2006

(65) Prior Publication Data

US 2007/0132885 A1    Jun. 14, 2007

(30) Foreign Application Priority Data

Dec. 12, 2005    (TW) ............................... 94221643 U

(51) Int. Cl.
*H04N 5/50*    (2006.01)

(52) U.S. Cl. ..................................... 348/552

(58) Field of Classification Search ................ 348/839, 348/836, 843, 706, 705, 725, 552, 553

See application file for complete search history.

(56) References Cited

U.S. PATENT DOCUMENTS

| 6,209,132 | B1 * | 3/2001 | Harrison et al. ............. 725/141 |
| 6,879,766 | B2 * | 4/2005 | Tomaru ....................... 385/129 |
| 7,301,583 | B2 * | 11/2007 | Tournier ..................... 348/706 |
| 7,463,311 | B2 * | 12/2008 | Flesch et al. ................ 348/589 |
| 2005/0289638 | A1 * | 12/2005 | Steading ..................... 725/151 |
| 2007/0028026 | A1 * | 2/2007 | Yeh et al. ....................... 711/4 |

* cited by examiner

*Primary Examiner*—Paulos M Natnael
(74) *Attorney, Agent, or Firm*—Bacon & Thomas, PLLC

(57) ABSTRACT

A TV signal processor is disclosed to include multiple signal receivers, a signal amplifier, a signal processor, signal decoder and a MINI-PCI interface. The TV signal processor further comprises a plurality of reserve pins arranged in a manner to meet a specification including the SVHS input signal pin, the CVBS input signal pin and the Audio input/output signal pin for inputting/outputting various audio/video signals. Thus, the use of MINI-PCI slots in the host may be effectively reduced and provide more convenience to the users.

6 Claims, 2 Drawing Sheets

TV SIGNAL PROCESSOR WITH MINI-PCI INTERFACE

BACKGROUND OF THE INVENTION

1. Field of the Invention

The present invention relates to a TV signal processor and more particularly, to such a TV signal processor, which comprises a MINI-PCI interface for transmitting a signal to a host, and a plurality of reserved pins arranged in a manner to meet a specification for inputting/outputting various audio/video signals to provide more convenience to a user.

2. Description of the Related Art

Since the creation of TV, plasma and LCD TVs have been intensively used to substitute for early CRT type monochrome TVs and CRT type color TVs. The modem advanced TVs provide high definition, high contrast ratio and colorful output. TV channels have been increased from few channels to more than one hundred channels. Following the step of time, TV signal transmission has also been digitalized.

The display of a TV signal, either an analog TV signal or digital TV signal, is done by means of a particular play mode. A TV monitor is connected to a video transceiver through a signal line for playing audio and video signals. A computer monitor must be connected to a computer for display of computer internal data. Following the stream of time, the nature of a computer monitor has been greatly changed. A computer can be connected to the Internet to receive remote signals. By means of a webcam, a computer can receive real-time video signal. In consequence, modern computer monitors can be used for different purposes. Nowadays, a computer monitor can be used with a computer for playing TV programs. However, a computer and a TV belong to different categories and use different A/V signal receiving, transmitting and playing programs. For watching TV programs on a computer, a set-top box or TV card must be used to convert TV audio/video signal into computer readable signals. The general set-top box or TV card receive only the cable or wireless analog or digital TV signals, namely, the cable analog TV signal, the wireless analog TV signal, the cable digital TV signal and the wireless digital TV signal. In other words, different types of TV signals cannot be received simultaneously. Generally, the TV card is installed inside the computer for saving space, and the TV cards are usually connected to the computer through the MINI-PCI (MINI-peripheral component interconnect) interface. Therefore, different TV cards are required for simultaneously watching analog or digital TV programs.

Furthermore, the host has a limited number of slots, and the slots are mostly used for connecting display card, sound effect card, Internet card or other types of interface cards. Accordingly, it is impossible to include additional slots for connecting a plurality of TV cards with various specifications. Besides, the notebook computer has very limited space to include any additional slots, and it is impractical to have a plurality of MINI-PCI interface cards installed within.

Therefore, how to overcome the defect of the conventional art is an important issue for the manufacturer in the field.

SUMMARY OF THE INVENTION

The present invention has been accomplished under the circumstances in view. It is therefore the main object of the present invention to provide a TV signal processor, which comprises a plurality of reserved pins in a manner to meet a specification including the SVHS input signal pin, the CVBS input signal pin and the Audio input/output signal pin for inputting/outputting various audio/video signals. Thus, the use of MINI-PCI slots in the host may be effectively reduced and provide more convenience to the users.

DETAIL DESCRIPTION OF THE INVENTION

Figure 1:
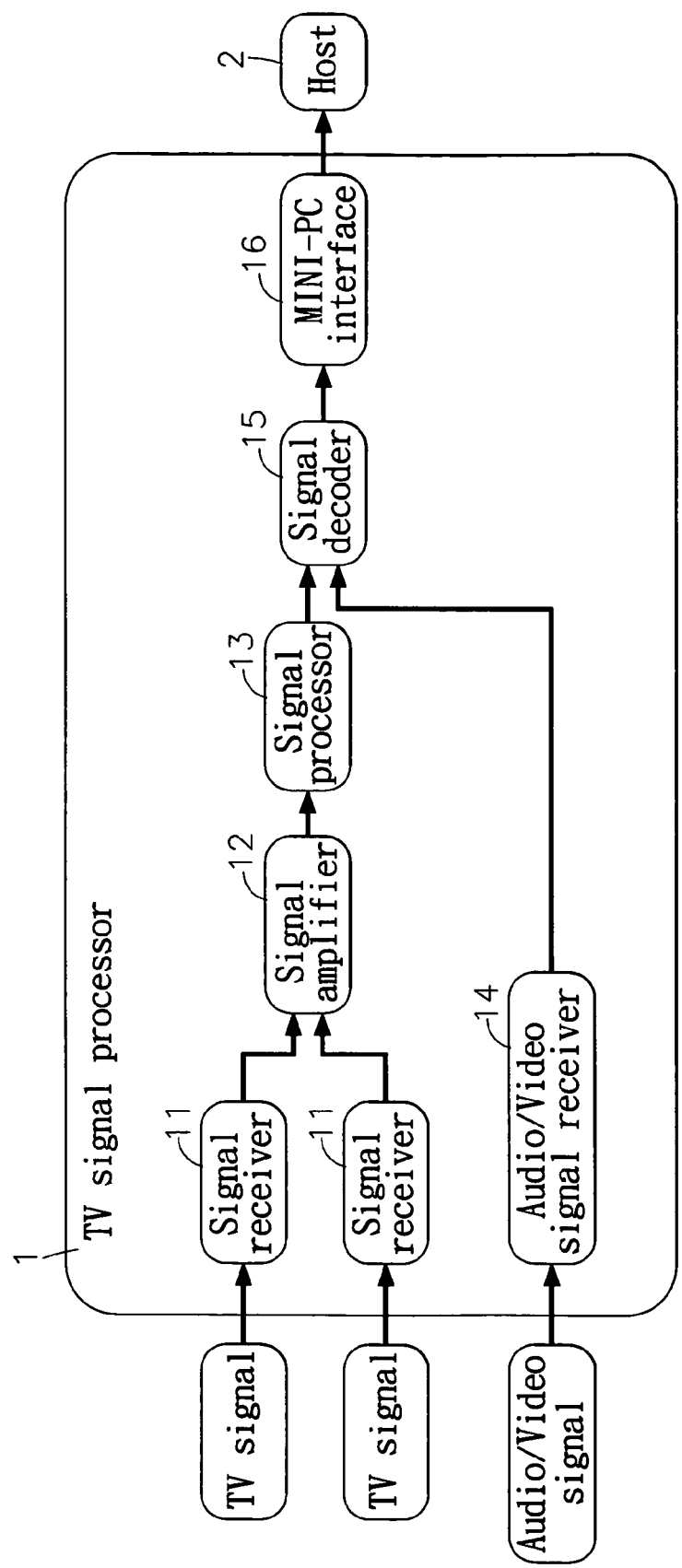
FIG. 1 is a block diagram of a TV signal processor with MINI-PCI interface according to an embodiment of the present invention.

Referring to FIG. 1, a TV signal processor 1 of the present invention is shown comprised of multiple signal receivers 11, a signal amplifier 12, a signal processor 13, an audio/video signal receiver 14, a signal decoder 15 and a MINI-PCI interface 16.

The signal receivers 11 are adapted to receive external TV signals. The signal receiver 11 can be a radio frequency signal receiver or a coaxial cable connector, and the external TV signal can be a digital TV signal or an analog TV signal.

The signal amplifier 12 is electrically connected to the signal receiver 11, and adapted to receive and optimize the TV signal that is received by the signal receivers 11. The signal amplifier 12 can be a radio frequency amplifier.

The signal processor 13 is electrically connected to the signal amplifier 12, and adapted to receive and demodulate the TV signal that is optimized by the signal amplifier 12.

The audio/video signal receiver 14 is adapted to receive an audio/video signal transmitted by a multi-media player (not shown). The audio/video signal can be an S-Video (separate-video) or a Composite-Video signal.

The signal decoder 15 is respectively electrically connected to the signal processor 13 and the audio/video signal receiver 14, and adapted to receive and decode the TV signal that is demodulated by the signal processor 13.

The MINI-PCI interface 16 is electrically connected to the signal decoder 15, and adapted to transmit the audio/video signal and TV signal decoded by the signal decoder 15 to a host 2.

The aforesaid external TV signal can be DVB-T, DVB-C, DVB-H, DVB-S, ATSC, ISDB-T, DMB-T digital or analog TV signal, and the aforesaid audio/video signal can be an S-Video signal or a Composite-Video signal. However, the invention is not limited to the processing of the aforesaid various different TV signals and audio/video signal.

Figure 2:
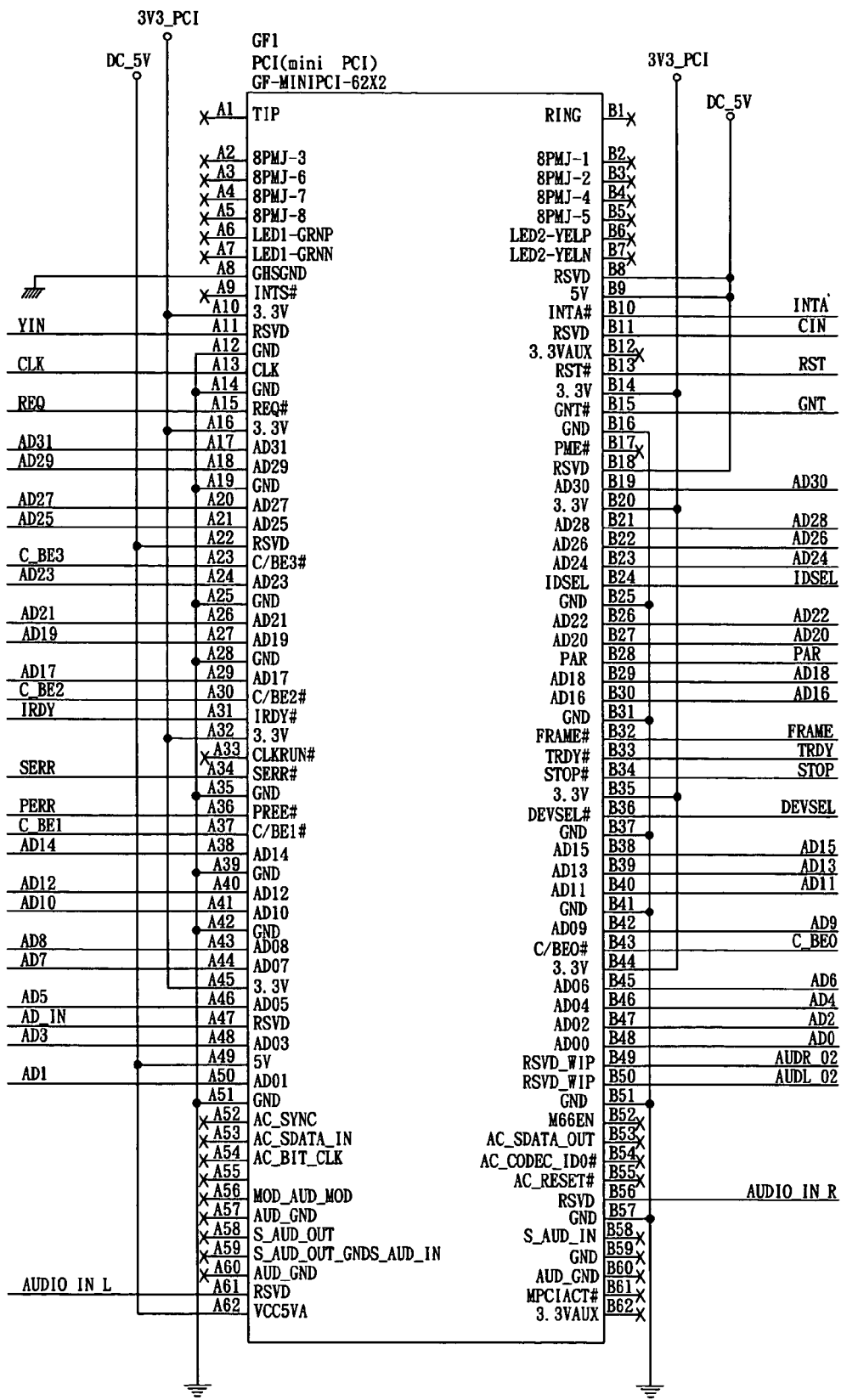
FIG. 2 shows a layout of pins according to an embodiment of the present invention.

Referring to FIG. 2, the TV signal processor 1 of the present invention further comprises a plurality of reserve pins arranged in a manner to meet a specification including pin A11, A22, B8, B18, A47, B49, B50, A61, B11 and B56. The pin A11 and B11 are the SVHS input signal pins, the pin A47 is the CVBS input signal pin, the pin A61 and B56 are the Audio input signal pins, the pin B49 and B50 are the Audio output signal pins, the pin A22, B8 and B18 are the power pins. Thus, the reserve pins comprise the SVHS input signal pin, the CVBS input signal pin and the Audio input/output signal pin for inputting/outputting various audio/video signals. Thus, the TV signal processor of the present invention may provide more convenience to the users.

Referring to FIGS. 1 and 2, after connection of the MINI-PCI interface 16 of the TV signal processor 1 to the host 2, the signal receiver 11 is used to receive the external TV signal. Because the TV signal is delivered by means of carrier wave, the signal receiver 11 transmit the carrier wave carried with TV signal to the signal processor 13 for enabling the carrier wave to be removed from the TV signal. After removal of the carrier wave, the signal processor 13 transmits the TV signal to the decoder 15, which decodes the TV signal into a digital multimedia file format or digital multimedia stream format. The decoder 15 transmits the decoded TV signal through the PCMCIA interface 16 to the host 2 for output. Thus, the user can watch analog TV programs as well as digital TV programs by means of the host 2. Furthermore, the use of MINI-PCI slots in the host 2 maybe effectively reduced.

When the user wishes to watch multi-media images, the audio/video signal receiver 14 is used to receive the audio/video signal transmitted by a multi-media player (not shown). The audio/video receiver 14 transmits the audio/video signal to the decoder 15, which decodes the audio/video signal into a digital multimedia file format or digital multimedia stream format. Then, the decoder 15 transmits the decoded audio/video through the MINI-PCI interface 16 to the host 2 for output. Thus, the user can watch the multi-media images.

Further, the aforesaid multi-media player can be a VCR, a digital video camera, a digital camera, a stereo system, a DVD (digital versatile disk) player or a VCD (video compact disc) player. The signal processor 13 can be a single-chip type or multi-chip type digital signal processor, analog signal processor or other type of signal processor capable of demodulate carrier wave carried TV signals.

Besides, the TV signal processor 1 of the present invention comprises a plurality of reserve pins arranged in a manner to meet a specification. The reserve pins comprise a SVHS input signal pin, a CVBS input signal pin and an Audio input/output signal pin for inputting/outputting various audio/video signals. Thus, the use of MINI-PCI slots in the host 2 may be effectively reduced and provide more convenience to the users.

A prototype of TV signal processor has been constructed with the features of FIGS. 1~2. The TV signal processor functions smoothly to provide all of the features discussed earlier.

Although particular embodiments of the invention has been described in detail for purposes of illustration, various modifications and enhancements may be may without departing from the spirit and scope of the invention. Accordingly, the invention is not to be limited except as by the appended claims.

What the invention claimed is:

1. A TV signal processor comprising:
    a plurality of reserve pins arranged in a manner to meet a specification, including a pin A11 and a pin B11 serving as SVHS input signal pins, a pin A47 serving as a CVBS input signal pin, a pin A61 and a pin B56 serving as Audio input signal pins, and a pin B49 and a pin B50 serving as Audio output signal pins;
    at least one signal receiver, said at least one signal receiver being for receiving a respective TV signal;
    a signal amplifier electrically connected to said at least one signal receiver and adapted to receive and optimize said TV signal that is received by said at least one signal receiver;
    a signal processor electrically connected to said signal amplifier and adapted to receive and demodulate said TV signal that is received by said associating signal receiver;
    a decoder electrically connected to said signal processor and adapted to receive and decode said TV signal that is demodulated by said signal processor;
    a MINI-PCI interface electrically connected to said decoder and adapted to transmit said TV signal decoded by said decoder to a host for output.

2. The TV signal processor according to claim 1, wherein said reserve pins comprises a pin A22 serving as a power pin.

3. The TV signal processor according to claim 1, wherein said reserve pins comprises a pin B8 serving as a power pin.

4. The TV signal processor according to claim 1, wherein said reserve pins comprises a pin B18 serving as a power pin.

5. The TV signal processor according to claim 1, wherein said decoder is electrically connected to an audio/video signal receiver for receiving audio/video signal.

6. The TV signal processor according to claim 5, wherein said audio/video signal can be an S-Video (separate-video) or Composite-Video signal.

* * * * *